US009621226B2

(12) United States Patent
Maor (10) Patent No.: US 9,621,226 B2
(45) Date of Patent: Apr. 11, 2017

(54) WIRELESS SIGNAL GENERATING CARDS AND METHODS AND SYSTEM OF USING SUCH CARDS (71) Applicant: Wise-Sec Ltd., Yokneam (IL)

(72) Inventor: Vadim Maor, Kiryat-Tivon (IL)

(73) Assignee: Wise-Sec Ltd., Yokneam (IL)

( * ) Notice: Subject to any disclaimer, the term of this patent is extended or adjusted under 35 U.S.C. 154(b) by 0 days.

(21) Appl. No.: 14/773,782

(22) PCT Filed: Mar. 5, 2014

(86) PCT No.: PCT/IL2014/050217
§ 371 (c)(1),
(2) Date: Sep. 9, 2015

(87) PCT Pub. No.: WO2014/141235
PCT Pub. Date: Sep. 18, 2014

(65) Prior Publication Data
US 2016/0020829 A1    Jan. 21, 2016

Related U.S. Application Data (60) Provisional application No. 61/775,859, filed on Mar. 11, 2013.

(51) Int. Cl.
*H04B 5/00* (2006.01)
*G06K 19/077* (2006.01)
*G06F 3/06* (2006.01)

(52) U.S. Cl.
CPC ......... *H04B 5/0031* (2013.01); *G06F 3/061* (2013.01); *G06F 3/0659* (2013.01); *G06F 3/0679* (2013.01); *G06K 19/07732* (2013.01)

(58) Field of Classification Search
CPC ...... G06F 3/061; G06F 3/0659; G06F 3/0679; G06K 19/07732; H04B 5/0031
See application file for complete search history.

(56) References Cited

U.S. PATENT DOCUMENTS 5,679,945 A * 10/1997 Renner ............... G06K 7/0008
235/441
2001/0006902 A1    7/2001 Ito
(Continued)

FOREIGN PATENT DOCUMENTS

CN         101789088     7/2010
WO     WO 2014/141235    9/2014

OTHER PUBLICATIONS

International Preliminary Report on Patentability Dated Sep. 24, 2015 From the International Bureau of WIPO Re. Application No. PCT/IL2014/050217.

(Continued)

*Primary Examiner* — Freshten N Aghdam (57) ABSTRACT

An electronic card connectable to a client terminal via a memory card reader slot. The electronic card comprises a card interface having at least one power supply pin set to be connected to at least one source terminal in an electronic card reader slot of a client terminal, a wireless communication unit electronically wired to be powered via the at least one power supply pin, and a signal encoder which operates the wireless communication unit to transmit a presence signal containing a unique identifier (ID) independently from any computational operation of the client terminal.

9 Claims, 5 Drawing Sheets (56) References Cited

U.S. PATENT DOCUMENTS

| | | |
|---|---|---|
| 2008/0029598 A1* | 2/2008 | Fernandes .............. G06K 7/084 |
| | | 235/449 |
| 2010/0033307 A1 | 2/2010 | Narendra et al. |
| 2010/0201845 A1* | 8/2010 | Feinberg ................ G06F 9/445 |
| | | 348/231.99 |
| 2011/0145464 A1 | 6/2011 | Tan |
| 2012/0178433 A1* | 7/2012 | Narendra ......... G06K 19/06187 |
| | | 455/420 |
| 2012/0303768 A1 | 11/2012 | Fiennes |
| 2013/0183936 A1* | 7/2013 | Smtih .................. H04W 12/06 |
| | | 455/411 |

OTHER PUBLICATIONS

International Search Report and the Written Opinion Dated Jun. 23, 2014 From the International Searching Authority Re. Application No. PCT/IL2014/050217.

* cited by examiner

WIRELESS SIGNAL GENERATING CARDS AND METHODS AND SYSTEM OF USING SUCH CARDS

RELATED APPLICATIONS

This application is a National Phase of PCT Patent Application No. PCT/IL2014/050217 having International filing date of Mar. 5, 2014, which claims the benefit of priority under 35 USC §119(e) of U.S. Provisional Patent Application No. 61/775,859 filed on Mar. 11, 2013. The contents of the above applications are all incorporated by reference as if fully set forth herein in their entirety.

FIELD AND BACKGROUND OF THE INVENTION

The present invention, in some embodiments thereof, relates to wireless communication and, more particularly, but not exclusively, to wireless signal generating memory card and methods of generating and using wireless signal generating memory cards.

Memory cards, such as flash memory cards have become a standard portable and to expandable storage medium for many host devices, including digital still cameras (DSC), personal digital assistants (PDA), moving picture experts group (MPEG) audio layer III (MP3) players, Smartphones, tablets, notebooks, personal media players (PMP), cell phones and other portable consumer electronics gadgets. As a portable device shrinks in physical size, the form factor of flash memory cards shrinks as well. The demand for higher functionality in audio and video aspects created a growing demand for increased memory capacity within flash memory cards.

Until few years ago, client terminals, such as cellular phones, tablets, digital cameras and the like had to be physically and electrically connected to a host computer to enable downloads and uploads of digital content. The digital content may be, for example, images, video images, marketing material, music content, and so forth. The application to manage and control uploads and downloads resides in the host computer.

This demand has led to the development of memory cards with wireless communication capabilities. For example, the SanDisk™ Eye-Fi Wireless Memory Card is set to wirelessly transfer photos and videos from a camera to a computer, tablet, or Smartphone. This Wireless Memory Card featuring built-in wireless connectivity for wirelessly upload photos and videos into a media library that is hosted on an external device.

SUMMARY OF THE INVENTION

According to some embodiments of the present invention, there is provided an electronic card connectable to a client terminal via a memory card reader slot. The electronic card comprises a card interface having at least one power supply pin set to be connected to at least one source terminal in an electronic card reader slot of a client terminal, a wireless communication unit electronically wired to be powered via the at least one power supply pin, and a signal encoder which operates the wireless communication unit to transmit a presence signal containing a unique identifier (ID) independently from any computational operation of the client terminal.

Optionally, the presence signal is a beacon signal.

Optionally, the signal encoder which operates the wireless communication unit to transmit the presence signal while the client terminal is turned off.

Optionally, the signal encoder which operates the wireless communication unit to transmit the presence signal while the client terminal is in an idle state.

Optionally, the unique identifier (ID) is associated with a user of the client terminal.

Optionally, the signal encoder operates the wireless communication unit to iteratively transmit the presence signal according to a predefined pattern.

More optionally, the wireless communication unit is configured to scan a frequency band to detect at least one signal present within the frequency band and to transmit the presence signal in response to the detection.

Optionally, the wireless communication unit is a Bluetooth™ module.

Optionally, the electronic card comprises a memory element; wherein the wireless communication unit establishes a wireless communication session with an external communication device, receives at least one data object during the wireless communication session and stores the at least one data object in the memory independently from an operation of the client terminal.

Optionally, the electronic card comprises a memory element; wherein the wireless communication unit establishes a wireless communication session with an external communication device, receives a message during the wireless communication session and stores the message in the memory to be accessed by the client terminal.

Optionally, the electronic card comprises a housing that contains the card interface, the wireless communication unit, and the signal encoder, the housing being sized and shaped according to a member of a group consisting of a compact flash (CF) card standard, for example secure digital (SD) card standard, mini SD card standard, micro SD card standard, memory stick card standard, and extreme definition (XD)-picture card standard.

Optionally, the wireless communication unit receives a message from an external communication device and emulates an insertion of the electronic card to the memory card reader slot by operating the card interface to trigger an operation of the client terminal.

According to some embodiments of the present invention, there is provided a presence identification system. The system comprises a repository which hosts a dataset associating between a plurality of users and a plurality of unique identifiers (IDs), a to plurality of electronic cards each connectable via an electronic card reader slot of a client terminal to be powered by the client terminal and set to transmit a presence signal containing a certain of the plurality of IDs independently from any computational operation of the connected client terminal, a plurality of receivers, each the receiver is set to scan a frequency band to detect the presence signal, and at least one identification unit which receives the presence signal, extracts the certain unique ID from the presence signal, matches the certain unique ID with a certain of the plurality of users using the dataset, and indicates a detected presence of one of the plurality of users in proximity to one of the plurality of receivers in response to the matching.

Optionally, the presence identification system comprises a billing unit which approves a transaction between the certain user and an entity associated the at least one identification unit based on the detected presence.

Optionally, the presence identification system comprises a monitoring module which monitors a location of each the user based on a respective the detected presence.

According to some embodiments of the present invention, there is provided a presence detection method. The method comprises providing a dataset associating between a plurality of users and a plurality of unique identifiers (IDs), adapting each of a plurality of electronic cards to transmit a presence signal containing a certain of the plurality of IDs, each the electronic card is connectable to be powered via a electronic card reader slot of a client terminal so as to perform the transmission of the presence signal independently from an operation of the connected client terminal, operating a plurality of receivers, each the receiver is operated to scan a frequency band to detect the presence signal, extracting the certain unique ID from the presence signal, matching the certain unique ID with a certain of the plurality of users using the dataset, and outputting an indicating of a presence of one of the plurality of users in proximity to one of the plurality of receivers in response to the matching.

Optionally, the method comprises sending to a respective of the plurality of electronic cards a message designated to the certain user via a direct communication channel formed with the respective electronic card.

Optionally, the message is generated according to an indirect message generated according to at least one of a received short message service (SMS), a received email, and a received push notification.

Optionally, the plurality of receivers are distributed in space.

Optionally, each the receiver is operated to trigger a transmission of a plurality of presence signal from a group of the plurality of electronic cards which are located in proximity thereto by transmitting a wake up message.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example to only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DESCRIPTION OF EMBODIMENTS OF THE INVENTION

The present invention, in some embodiments thereof, relates to wireless communication and, more particularly, but not exclusively, to wireless signal generating memory card and methods of generating and using wireless signal generating memory cards.

According to an aspect of some embodiments of the present invention there are provided electronic cards which are set be powered directly via a memory card reader slot of a hosting client terminal and to transmit a presence signal, such as a beacon signal, regardless to any computational operation of the hosting client terminal and/or without installing any application or code that instructs and/or triggers the transmission of the presence signal. As exemplified below, the presence may be encoded as a wireless personal area network (WPAN) message, a wireless local area network (WLAN) message, radio frequency identification (RFID) and/or the like. The electronic cards may be defined to interface with memory card reader slots such as flash memory card reader slots, for example compact flash (CF) card standard, for example secure digital (SD) card standard, mini SD card standard, micro SD card standard, memory stick card standard, and extreme definition (XD)-picture card standard. An electronic card, also referred to as a connectable card, may include one or more memory elements which are set to store data received wirelessly by a transmission unit of the electronic card and/or data transmitted wirelessly by the transmission unit. In such embodiments, a communication between the connectable card and an external entity can be established without any operation from the hosting client terminal side. Additionally or alternatively, a communication channel may be established between the hosting client terminal and an external entity via the connectable card, for example using a memory of the connectable card as a buffer. Such a communication channel may be used as a secured channel for forwarding messages, for example location based messages between the sides without exposing the integral communication services of the hosting client terminal and/or as a communication means that enhances a client terminal that does not support communication with the external entity.

According to an aspect of some embodiments of the present invention there are provided methods and systems of using electronic cards, for example as outlined above and described below, for monitoring and/or locating users (for brevity referred to herein interchangeably) and/or allowing users to perform location based actions, such as approving transactions, receiving messages, sending messages, indicating presence and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
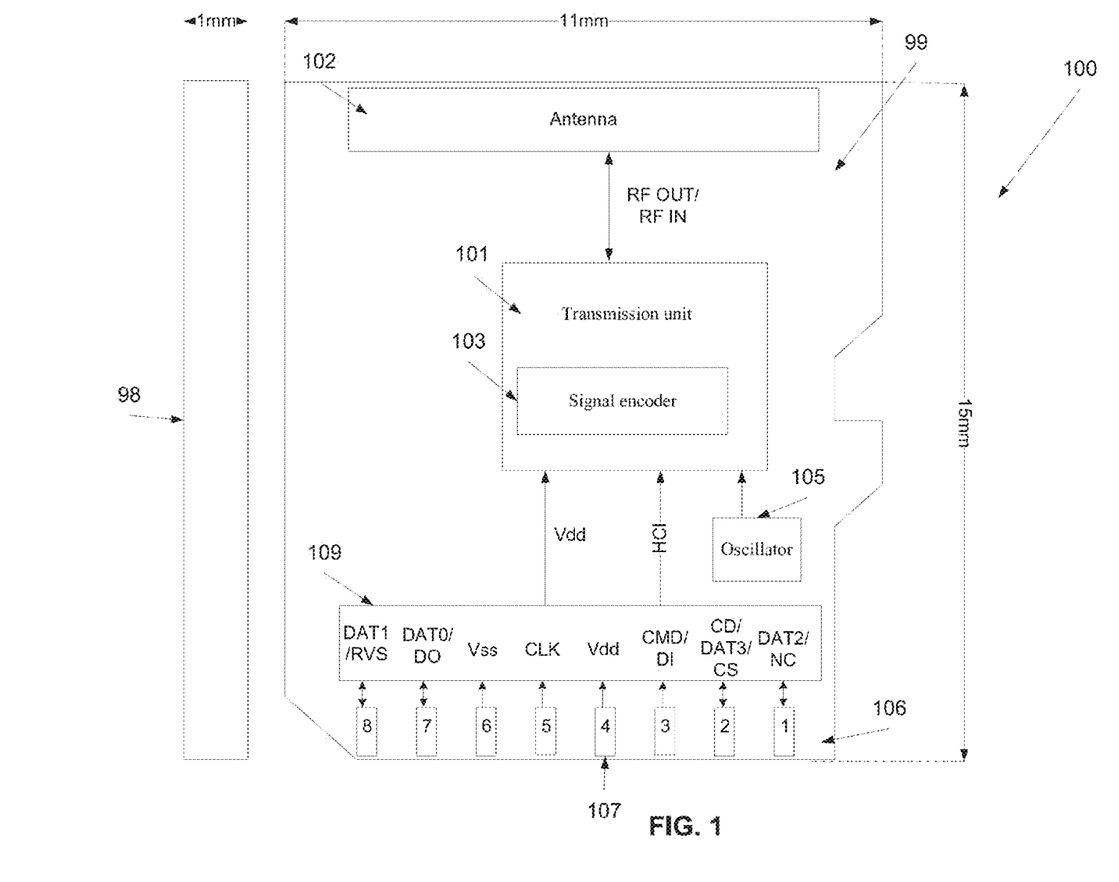
FIG. 1 is a schematic illustration of an exemplary arrangement of internal components of a connectable card set to be powered via a memory card reader slot of a client terminal independently from the operation of the client terminal, according to some embodiments of the present invention.

Reference is now made to FIG. 1, which is a schematic illustration of an exemplary arrangement of internal components of a connectable card 100, also referred to as an electronic card, set to be powered via a memory card reader slot of a hosting client terminal and to transmit a signal containing identification (unique ID) data, referred to herein a presence signal, for example a beacon signal, optionally independently from the operation of the hosting client terminal, according to some embodiments of the present invention. The connectable card 100 may be formatted according to a compact flash (CF) card standard, for example secure digital (SD) card standard, mini SD card standard, micro SD card standard, memory stick card standard, and extreme definition (XD)-picture card standard. The memory card reader slot may be formatted according to any of the above standards. As used herein, a client terminal means a personal electronic device, such as a cellular phone, a Smartphone, a tablet, a laptop, and/or, the like. It should be noted that the client terminal may be a simple communication device without any WLAN and/or WPAN capabilities. The components of connectable card 100 of FIG. 1 are housed in a housing 99 that is sized and shaped as an SD card, for example has a thickness of about 1 millimeter, a width of about 11 millimeter (mm) and a length of about 15 mm. Another housing may be used to fit into reader slots of other memory devices. As used herein, an action performed independently from the operation of a hosting client terminal by the connectable card 100 means an action performed regardless to any input from the hosting client terminal, the state of the hosting client terminal, while the hosting client terminal is idle, without any computational operation the hosting client terminal, while the hosting client terminal is turned off and/or the like. It should be noted that the hosting client terminal may not host any application that communicate with the connectable card 100.

The connectable card 100 includes a transmission unit 101 that is wired to a wireless communication antenna 102, and a card interface that optionally has a data bus 109 that is defined to power the transmission unit 101 via the memory card reader slot of the client terminal. Optionally, while the card interface includes one or more power supply pins interfacing with source terminal(s) of the memory card reader slot, the card interface does not interface with other source terminal(s) of the memory card reader slot, for example does not interface with data source terminal(s). For instance, the card to interface interfaces only with the host controller interface (HCI), Vdd, and/or ground (Gnd) source terminals.

Optionally, the connectable card 100 includes an oscillator that is connected to the transmission unit 101. Optionally, the connectable card 100 further comprises a signal encoder 103 that is set to instruct the transmission unit 101 to generate a signal containing unique ID data, for example a user unique ID, a device unique ID, and/or any value that uniquely identify a member of a group, for example a group of subscribers and/or users. The signal encoder 103 may be part of the transmission unit 101. Optionally, the transmission unit 101 is or includes an WPAN module, for example a Bluetooth™ system on chip (SoC) or a Zigbee™ SoC, a WLAN module, for example a WiFi™ SoC and/or RFID module, for example RFID SoC and/or the like.

In the embodiments exemplified by FIG. 1, the data bus 109 of the card interface optionally has a power supply pin 107 set to be connected to supply pin terminal in a memory card reader slot of a client terminal. The power supply pin may be one of a plurality of pins 106, active and/or inactive, defined according to a memory card protocol. For example, the following Table 1 and Table 2 indicate the signal function of each pin in serial peripheral interface (SPI) and SD modes:

TABLE 1 microSD Pinout, SPI Mode

| Pin # | Pin Name | Signal Function |
|---|---|---|
| 1 | NC | No Connect |
| 2 | CS | Chip Select |
| 3 | DI | Master Out/Slave In (MOSI) |
| 4 | Vdd | Supply Voltage 2.7 v/3.6 v |
| 5 | CLK | Clock |
| 6 | Vss | Ground |
| 7 | DO | Master In/Slave Out (MISO) |
| 8 | RSV | Reserved |

TABLE 2 microSD Pinout, SD Mode

| Pin # | Pin Name | Signal Function |
|---|---|---|
| 1 | DAT2 | Data Bit 2 |
| 2 | CD/DAT3 | Card Detect/Data Bit 3 |
| 3 | CMD | Command Line |
| 4 | Vdd | Supply Voltage 2.7 v/3.6 v |
| 5 | CLK | Clock |
| 6 | Vss | Ground |
| 7 | DAT0 | Data Bit 0 |
| 8 | DAT1 | Data Bit 1 |

The direct connection between the power supply pin(s) 107 of the connectable card and the supply pin terminal(s) of the memory card reader slot of the hosting client terminal allows powering the transmission unit 101 regardless and independently from the operation of the hosting client terminal. This allows the connectable card to operate the transmission unit 101 for transmission of a signal containing the unique ID of the user and/or the hosting client terminal and/or the connectable card, either in response to to the detection of a query signal and/or according to a predefined pattern, for example iteratively and/or continuously.

For example, the transmission unit 101 is operated to transmit a presence signal containing a unique ID associated with the connectable card 100, for instance stored in memory component thereof every 0.1 second (sec), 1, sec, 5 sec, 10 sec, 30 sec, 1 minute (min), 5 min or any intermediate or longer periods. It should be noted that as the transmission is made independently from client terminal, energy pertaining to the operation of the processor of the client terminal and the execution of operating system actions of the client terminal is saved.

Optionally, the connectable card 100 does not have a memory element that is accessible by the client terminal Optionally, the connectable card 100 includes only the power supply pin 107. In such embodiment, the client terminal may not even identify the connection to the connectable card 100.

According to some embodiments of the present invention, the signal encoder 103 is set to instruct the transmission unit 101 during an authentication session, for example executing a automated handshaking process to set dynamically parameters of a communications channel established between the connectable card 100 and an external terminal before a transaction is made or a private key (e.g. unique identity) is forwarded from the contactable device over a wireless channel. Optionally, no data connection is established between the signal encoder 103 and the hosting client terminal, increasing data protection for the unique IDs and/or any data that may be represented in the signals transmitted by the transmission unit 101.

According to some embodiments of the present invention, the connectable card is a memory card that also includes a memory component, such as a flash memory component. In such embodiments, the transmission unit 101 may be used to receive data objects independently from the operation of the client terminal and to store the received to data object in the memory component.

Figure 2:
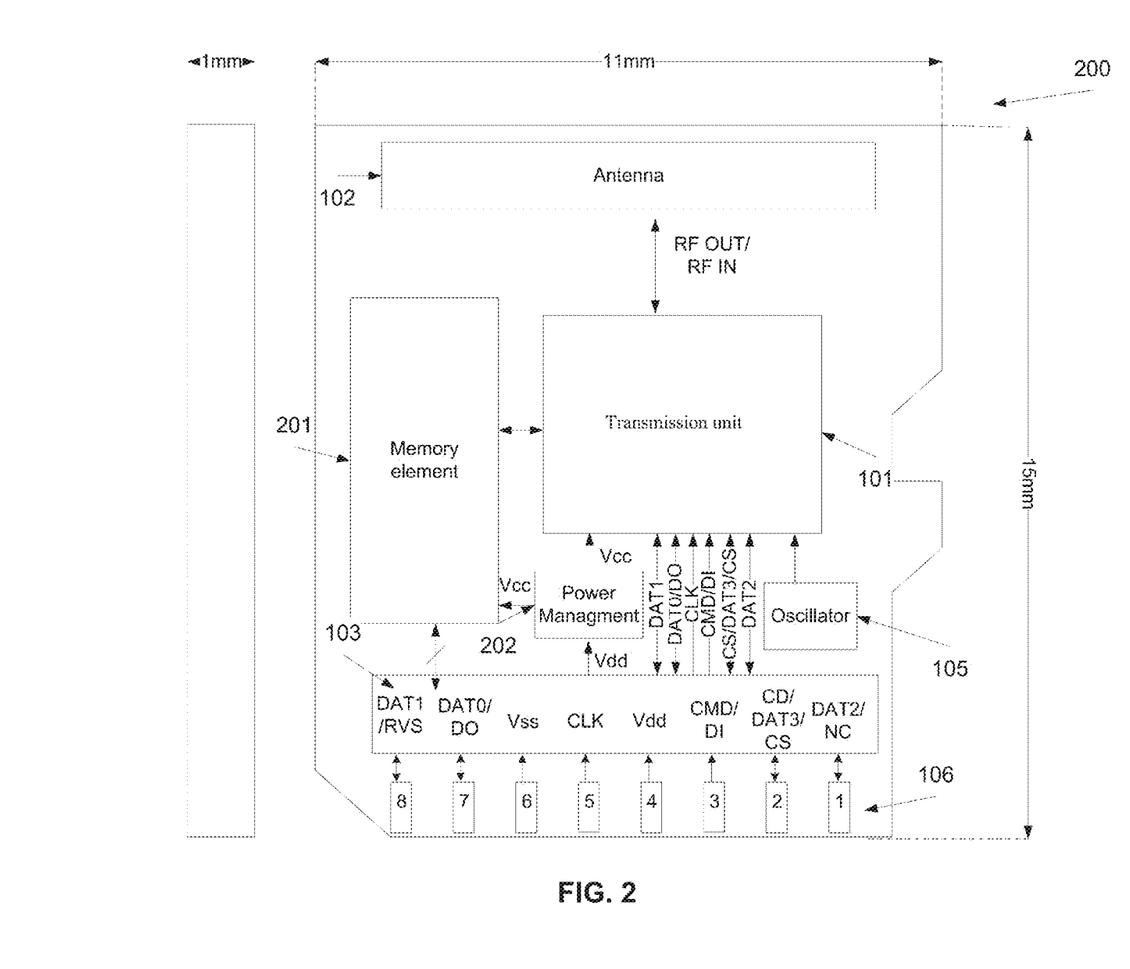
FIG. 2 is another schematic illustration of an exemplary arrangement of internal components of a connectable memory card, according to some embodiments of the present invention.

For example, reference is now made to FIG. 2, which is a schematic illustration of an exemplary arrangement of internal components of a connectable memory card 200 that includes the components of connectable card 100 and memory element 201, according to some embodiments of the present invention.

As depicted in FIG. 2, the memory card 200 includes a power management unit 202 that manages power distribution between the memory element 201 and the transmission unit 101, and optionally converts Vdd, a positive supply in field effect transistor (FET) circuits, to Vcc, positive supply in bipolar circuits.

Figure 3:
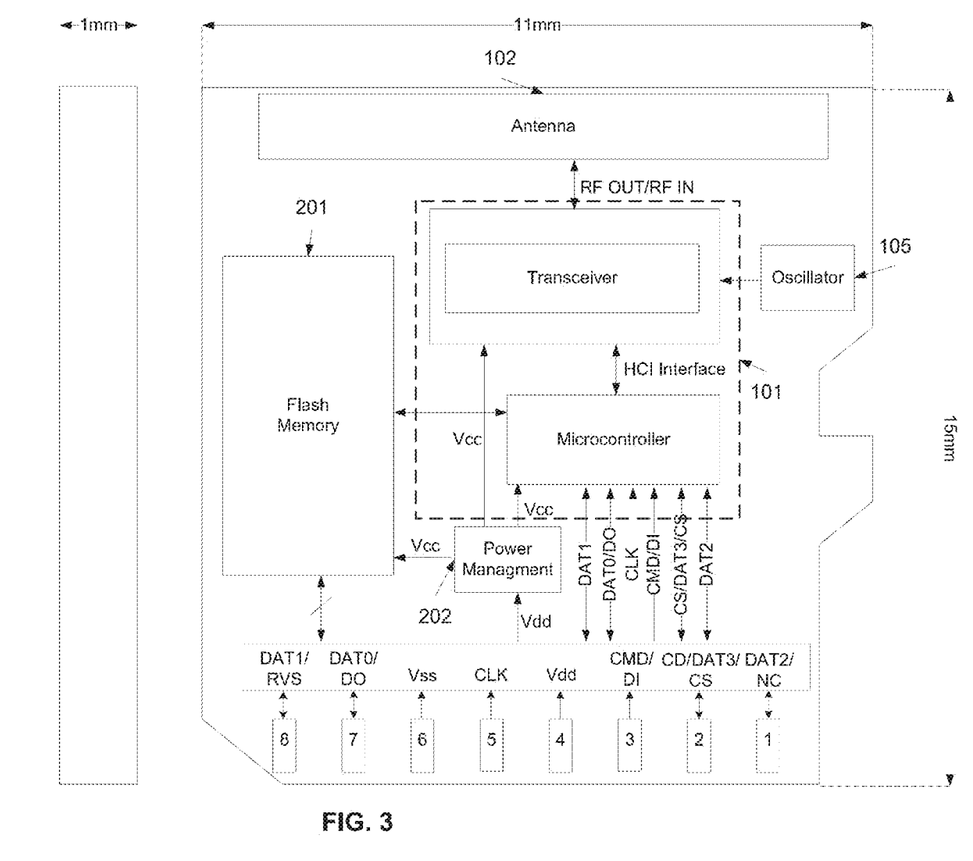
FIG. 3 is a schematic illustration of an exemplary arrangement of internal components of a connectable memory card, according to some embodiments of the present.

Another exemplary arrangement of components of is depicted in FIG. 3, which is a schematic illustration of an exemplary arrangement of internal components of a connectable memory card 300, according to some embodiments of the present invention. Some of the components, which are indicated by the numerals presented in FIGS. 1-2, are in the arrangement presented in FIG. 3; however, in these embodiments, the transmission unit 101 includes a microcontroller that operates a transceiver, such as a Bluetooth™ transceiver, to transmit a presence signal containing a unique ID.

Optionally, a host communication module is used for managing the communication between the transmission unit 101 and the hosting client terminal, for example during or after the authentication session. In such embodiments, the host communication module may be used to manage the communication with the hosting client terminal, for example to determine when to establish a communication with the hosting client terminal based on an analysis of wirelessly received data. Optionally, the host communication module determines when to involve the hosting client terminal based on a set of rules. In such a manner, the hosting client terminal is operated by the connectable card only when needed and not for transmitting the presence signal and/or for forwarding data that is already available on the memory element 201.

Figure 4:
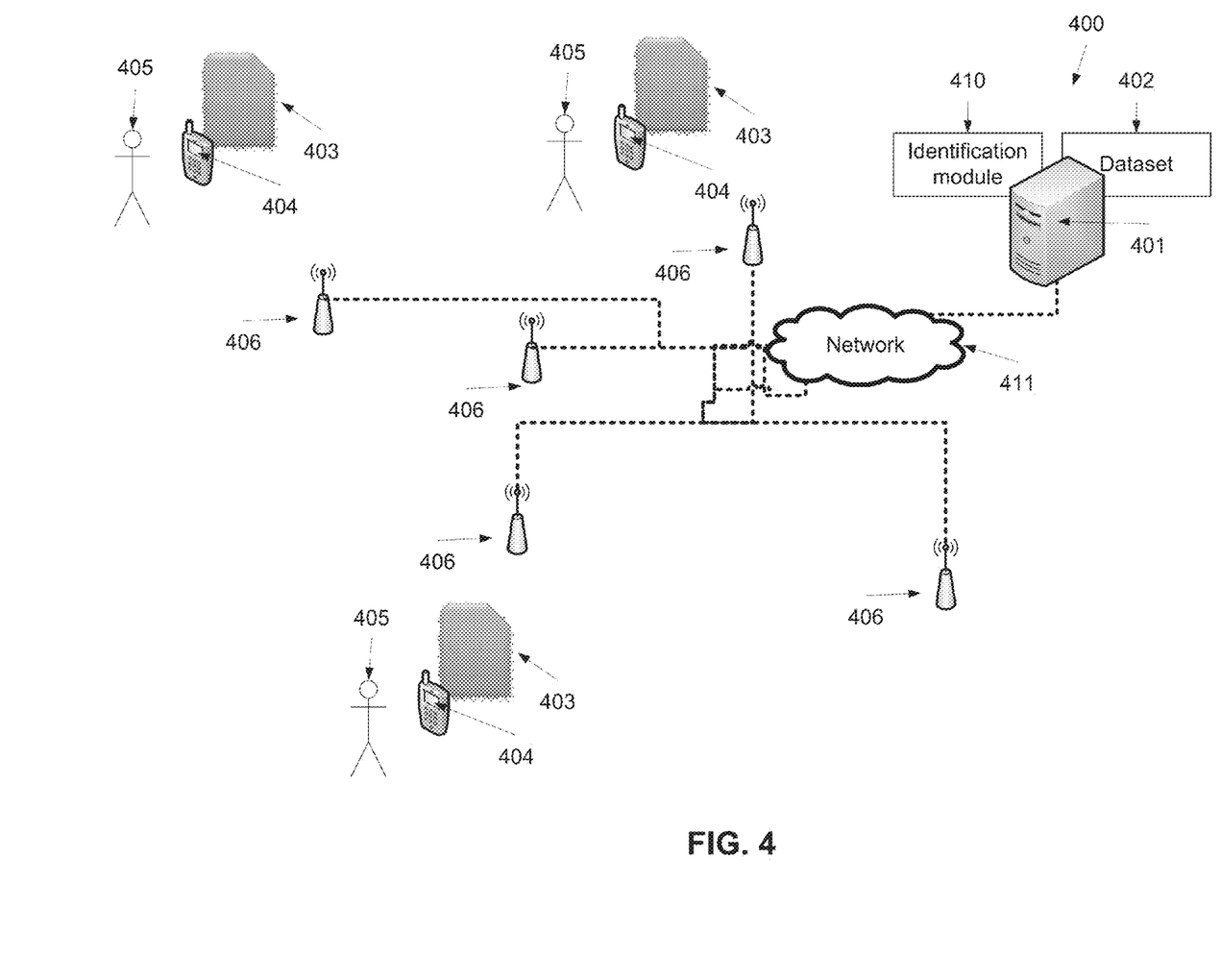
FIG. 4 is a schematic illustration of a presence identification system for locating a plurality of users in an area and/or for allowing users to perform proximity based actions, such as approving transactions, according to some embodiments of the present invention.

Reference is now also made to FIG. 4, which is a schematic illustration of a presence identification system 400 for locating a plurality of users in an area and/or for allowing users to perform actions and/or operations by bringing their client terminals to proximity with an external terminal, such as a payment stand, by identifying signals originated from contactable cards powered by the client terminals and transmitting signals containing unique IDs, according to some embodiments of the present invention. The system 400 is optionally used to locate users in a space and/or to allow users to indicate their presence in proximity to a certain stand or device, for example for an identification of an action (i.e. access control identification action, attendance identification action, payment action, for instance in a similar to manner to an near field communication (NFC) payment and/or the like).

The system 400 includes a repository 401 that hosts a dataset 402 associating between a plurality of users and a plurality of unique IDs. The system further includes a plurality of connectable cards 403, each as described above, for example with reference to any of FIGS. 1-3. Each connectable card is set to transmit a signal containing a unique ID. For example, the users are distributed with connectable cards 403 to be installed in client terminals 404 so that each user 405 installs a connectable card 403 that transmits her unique ID, either in response to a query and/or iteratively or repetitively. As used herein, an external terminal may be any device that includes a receiver for identifying signals from contactable cards, either passively or actively, for example for identification, payment, statistical analysis, action reception, monitoring and/or the like.

The system 400 further includes a plurality of receiver units 406 each includes a receiver, a transmitter and/or transceiver, for example WPAN and/or WLAN receivers and/or transceivers, distributed in a space. Each receiver and/or transceiver 406 is set to scan a frequency band to detect a presence signal, either passively or actively by initiating a wake-up process, for example by broadcasting a wake up message iteratively, periodically, and/or upon receiving a presence indication from another sensor, such as a volume detector and/or an imager. Optionally, the wake-up process includes reinitializing the contactable card and/or the card interface of the contactable card, emulating a reinsertion of the contactable card, for example in a manner that triggers the operating system and/or the processor of the client terminal.

The receivers and/or transceivers 406, for brevity referred to herein as receiver units 406, may be integrated in stands and/or devices, allowing user to indicate a will to perform certain proximity based action, for example approving a transaction or indicating presence, by locating the hosting client terminal 404 in proximity to one of the receiver units 406. In such embodiment, a bidirectional communication may be established between the connectable card 403 and the receiver unit 406, for instance for executing an interactive authentication and/or identity verification process. In such embodiment, a user interface module (not shown)

installed in the hosting client terminal 404 may communicate with the connectable card 403 to allow the respective user 405 to complete the authentication and/or identity verification process.

Optionally, data received from the hosting client terminal 404 is directly forwarded to the wireless communication unit through the data bus 109 of the contactable card. Optionally, data received from the hosting client terminal 404 is forwarded the memory element 201 and extracted therefrom by the wireless communication unit for transmission. Optionally, only data from the memory element 201 is made accessible to external terminal, avoiding any access to the data of the hosting client terminal.

The receiver units 406 and/or the connectable cards 403 are optionally adapted to the usage of the system 400. In a system wherein receiver units 406 are used for identifying a will to perform a certain presence based action, such as approving a transaction, for example receivers installed in payment stands, the receiver may be set to identify a close proximity of a connectable card to the receiver, for instance less than about 10 centimeters (cm) or 5 cm, for example a touch event. In another for example, receivers are used for mapping location of users in an area so that the receiver is set to identify a presence of a connectable card in a certain sub area, for instance about 10 m from a receiver. The presence may be estimated according to the intensity of the signal and/or in combination with other location markers, for instance querying for locational data that is acquired from the location sensors or modules of the hosting client terminal. For instance, after a receiver identifies a presence of a certain connectable card in proximity thereto, the receiver initiates a communication session, querying for more location related data, such as data from the global positioning system (GPS) module and/or from a cellular location service.

The system 400 further includes one or more ID extraction module(s) 410 which are set to extract the unique ID from the presence signals which are identified by the receiver units 406. The ID extraction module 410 is optionally located at a central unit and receives the intercepted signals from the receiver units 406 via a communication network 411, such as WLAN. Additionally or alternatively, the ID extraction module 410 is located at each receiver and set to extract the unique ID and optionally to forward to it to a central unit.

The system 400 further includes one or more identification module(s) 412 which are designed to match between a unique ID extracted from a detected signal and a user from the dataset 402. This allows the identification module(s) 412 to indicate which one of the users is located in proximity thereto. The identification module 412 is optionally located at the central unit and receives the IDs in messages from the receiver units 406 via the communication network 411, such as WLAN.

Additionally or alternatively, an ID extraction module, such as 412, is located at each receiver unit and set to access the dataset 402 for matching the unique ID. In such embodiment, presence indications may be forwarded to the central unit. The indications allow a billing module or unit to bill a user based on the detection and/or a monitoring module or unit to map the location of a user based on the detection. For example, the system may be connected to a number of payment terminals (each having a receiver) and/or a number of monitoring terminals (each having a receiver) which are connected to a central mapping module.

Additionally or alternatively, one or more of the receiver units 406 are set to establish communication channels with the connectable cards 403 which are located in proximity thereto. For example, after a receiver unit identifies that a connectable card 403 associated with a certain user is located in proximity thereto it sends her a message and/or a data object, for instance location based message, optionally personalized based on her unique ID. Optionally, the message and/or the data object are stored in the memory of the connectable card 403 until being accessed by the hosting client terminal (i.e. operated by the user and/or an application) and/or until a certain time, for example a time indicated by a time tag attached to the message. In another example, after a receiver unit identifies that a connectable card 403 associated with a certain user is located in proximity thereto it receives from the connectable card a predefined message and/or data object, optionally designated for the receiver unit 403 that may be identified during the a channel establishment process.

Figure 5:
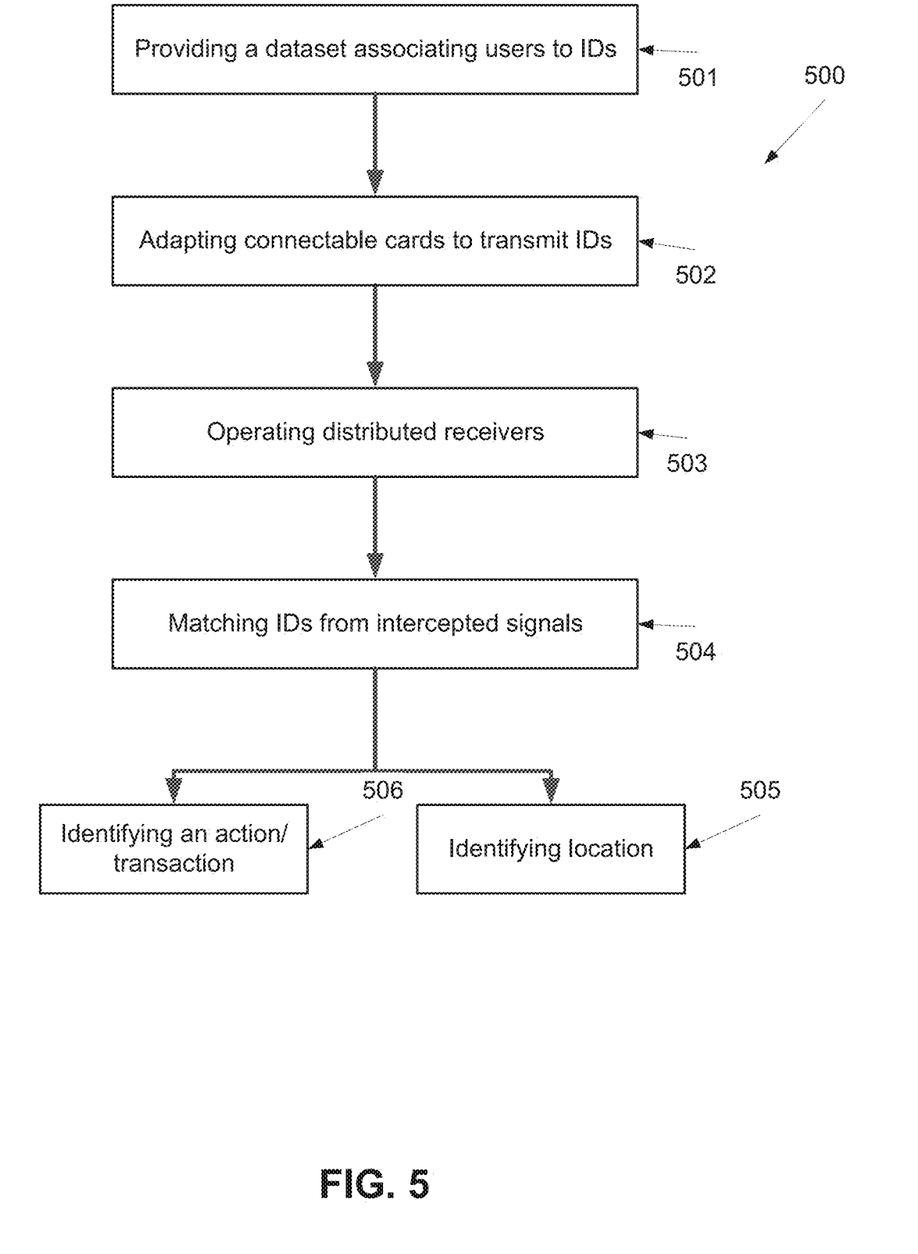
FIG. 5 is a flowchart of a method of localizing users in an area, according to some embodiments of the present invention.

Reference is also made to FIG. 5, which is a flowchart of a method of localizing a plurality of users in an area and/or allowing them to perform presence based actions, using a system, for example as depicted in FIG. 4, according to some embodiments of the present invention.

First, as shown at 501, a dataset associating between a plurality of users and a plurality of unique IDs such as 402 is provided. As shown at 502, each of a plurality of connectable cards, for example as depicted in 501, is set to transmit a presence signal containing a certain of the plurality of IDs. For example, the memory of each connectable card is updated with a unique ID. Each connectable card is optionally as depicted in any of FIGS. 1-3. Now, as shown at 503, each receiver unit from a set of receiver units, which are optionally distributed in one or more spaces, for example 406, is operated to identify the signals from the connectable cards. For example, the receiver units may be distributed in a mall, a facility, an office, and/or the like. This allows each one of them, as shown at 504, to extract the unique IDs represented, for example encrypted, in these signals and to match them with data from the dataset for identifying users who are located in proximity to them. Optionally, signals containing unique IDs are captured during a bidirectional communication session. This allows, as shown at 505, to indicate of a presence of some or all of the users in proximity to respective receivers, for example as described above. This also allows identifying users who perform proximity based actions, such as approving transactions and/or indicating presence, actively by placing their client terminals in proximity to the receivers, for example as described above, or passively by being in proximity to the receivers.

Additionally or alternatively, a direct communication channel with the hosting client terminal may be established via the connectable card, for example by using the memory element of the connectable card as a buffer and/or by connecting the transmission unit to the hosting client terminal directly. The communication may be peer to peer communication. The communication may indirect communication, where messages received by short message service (SMS) messages and/or emails and/or push notifications which are converted to messages send by one of the receiver units to one or more of the connectable cards therearound.

The direct communication channel allows forwarding location based massages to the hosting client terminal without using external system for locating, for example without using a global system for mobile communications (GSM) interceptor and/or the like.

It is expected that during the life of a patent maturing from this application many relevant systems and methods will be developed and the scope of the term a module, a to receiver, a client terminal, and a memory card is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An electronic card connectable to a client terminal via a memory card reader slot, the electronic card comprising:
   a card interface having at least one power supply pin set to be connected to at least one source terminal in an electronic card reader slot of a client terminal;
   a wireless communication unit electronically wired to be powered via said at least one power supply pin; and
   a signal encoder which operates said wireless communication unit to transmit a presence signal containing a unique identifier (ID) independently from any computational operation of said client terminal, wherein said wireless communication unit receives a message from an external communication device and emulates an insertion of said electronic card to said memory card reader slot by operating said card interface to trigger an operation of said client terminal;
   wherein said signal encoder operates said wireless communication unit to iteratively transmit said presence signal according to a predefined pattern;
   wherein said wireless communication unit is configured to scan a frequency band to detect at least one signal present within said frequency band and to transmit said presence signal in response to said detection.

2. The electronic card of claim 1, wherein said presence signal is a beacon signal.

3. The electronic card of claim 1, wherein said signal encoder which operates said wireless communication unit to transmit said presence signal while said client terminal is turned off.

4. The electronic card of claim 1, wherein said signal encoder which operates said wireless communication unit to transmit said presence signal while said client terminal is in an idle state.

5. The electronic card of claim 1, wherein said unique identifier (ID) is associated with a user of said client terminal.

6. The electronic card of claim 1, wherein said wireless communication unit is a Bluetooth™ module.

7. The electronic card of claim 1, further comprising a memory element; wherein said wireless communication unit establishes a wireless communication session with an external communication device, receives at least one data object during said wireless communication session and stores said at least one data object in said memory independently from an operation of said client terminal.

8. The electronic card of claim 1, further comprising a memory element; wherein said wireless communication unit establishes a wireless communication session with an external communication device, receives a message during said wireless communication session and stores said message in said memory to be accessed by said client terminal.

9. The electronic card of claim 1, further comprising a housing that contains said card interface, said wireless communication unit, and said signal encoder, said housing being sized and shaped according to a member of a group consisting of a compact flash (CF) card standard, a secure digital (SD) card standard, a mini SD card standard, a micro SD card standard, a memory stick card standard, and an extreme definition (XD)-picture card standard.

\* \* \* \* \*